(12) United States Patent
Yamamoto et al.

(10) Patent No.: US 12,462,837 B2
(45) Date of Patent: Nov. 4, 2025

(54) MAGNETIC DISK DEVICE AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Shoya Yamamoto, Saitama Saitama (JP); Masafumi Iwashiro, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/830,381

(22) Filed: Sep. 10, 2024

(65) Prior Publication Data

US 2025/0279117 A1    Sep. 4, 2025

(30) Foreign Application Priority Data

Mar. 1, 2024  (JP) .................................. 2024-031640

(51) Int. Cl.
  *G11B 5/596*  (2006.01)
(52) U.S. Cl.
  CPC ................................ *G11B 5/59688* (2013.01)
(58) Field of Classification Search
  None
  See application file for complete search history.

(56) References Cited

U.S. PATENT DOCUMENTS

| | | | |
|---|---|---|---|
| 8,537,485 B2 | 9/2013 | DeRosa et al. | |
| 8,737,013 B2 | 5/2014 | Zhou et al. | |
| 8,953,278 B1 | 2/2015 | Zhou et al. | |
| 8,970,979 B1 * | 3/2015 | Jia ...................... | G11B 5/59622 360/75 |
| 8,982,503 B1 * | 3/2015 | Chang ................ | G11B 5/59627 360/75 |
| 9,013,825 B1 * | 4/2015 | Chahwan ........... | G11B 5/59694 360/75 |
| 9,058,827 B1 * | 6/2015 | Tu ....................... | G11B 5/59694 |
| 9,111,575 B1 * | 8/2015 | Zhou ....................... | G11B 19/28 |
| 9,202,496 B2 * | 12/2015 | Supino ..................... | G11B 5/58 |
| 9,460,744 B1 * | 10/2016 | Gaub ................. | G11B 5/59694 |
| 9,747,936 B1 * | 8/2017 | Eklund ................ | G11B 19/046 |

(Continued)

*Primary Examiner* — Fred Tzeng
(74) *Attorney, Agent, or Firm* — Knobbe, Martens, Olson & Bear, LLP

(57) ABSTRACT

According to an embodiment, a controller corrects an instruction value of a VCM current by a first feedforward control based on a first detection value obtained by a first sensor. The controller executes a first operation in accordance with occurrence of a set event. In the first operation, the controller acquires a first waveform that is a waveform of a deviation amount of a detection position from a target position of a magnetic head, and acquires from the first waveform a first frequency band that is a frequency band whose amplitude is greater than a first threshold. The controller adjusts a coefficient of a transfer function of the first feedforward control to suppress the first detection value in a second frequency band different from the first frequency band and output a correction amount for a first instruction value based on the first detection value in the first frequency band.

20 Claims, 6 Drawing Sheets

(56) References Cited

U.S. PATENT DOCUMENTS

| | | | |
|---|---|---|---|
| 10,347,278 B1* | 7/2019 | Kiyonaga | G11B 19/042 |
| 10,984,831 B1 | 4/2021 | Zhou et al. | |
| 2009/0034116 A1* | 2/2009 | Higashino | G11B 19/042 |
| | | | 360/78.06 |

* cited by examiner

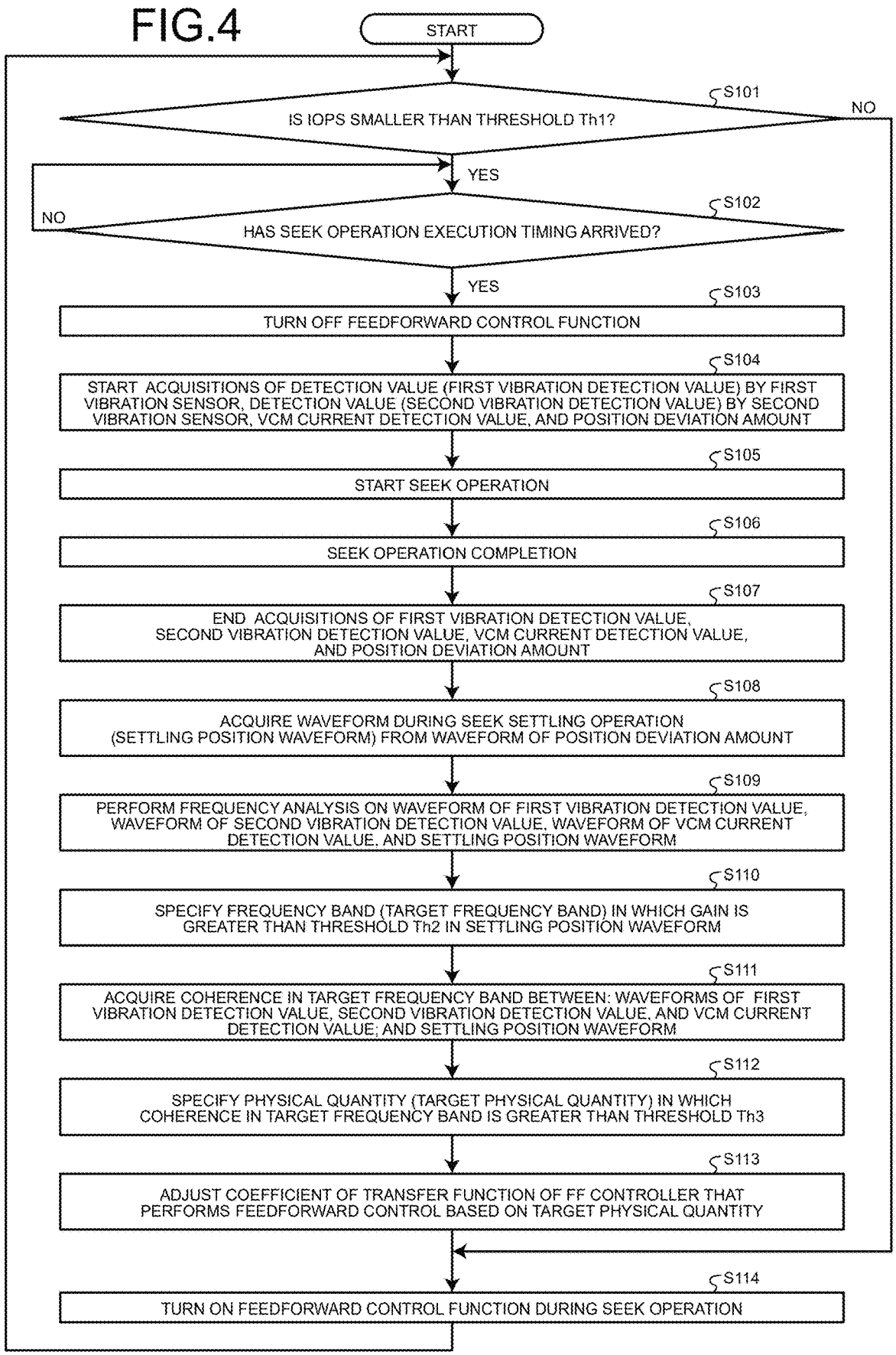

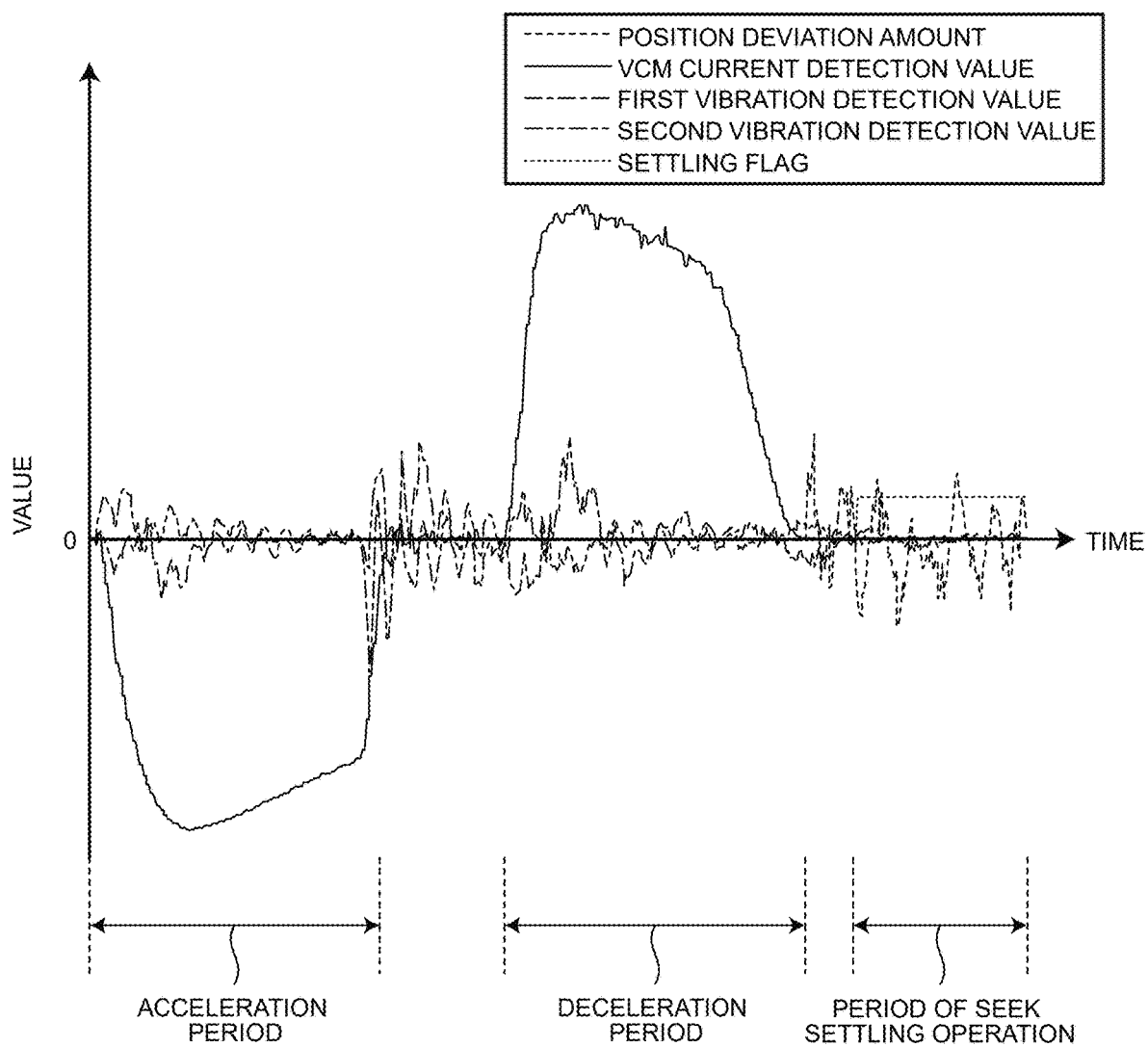

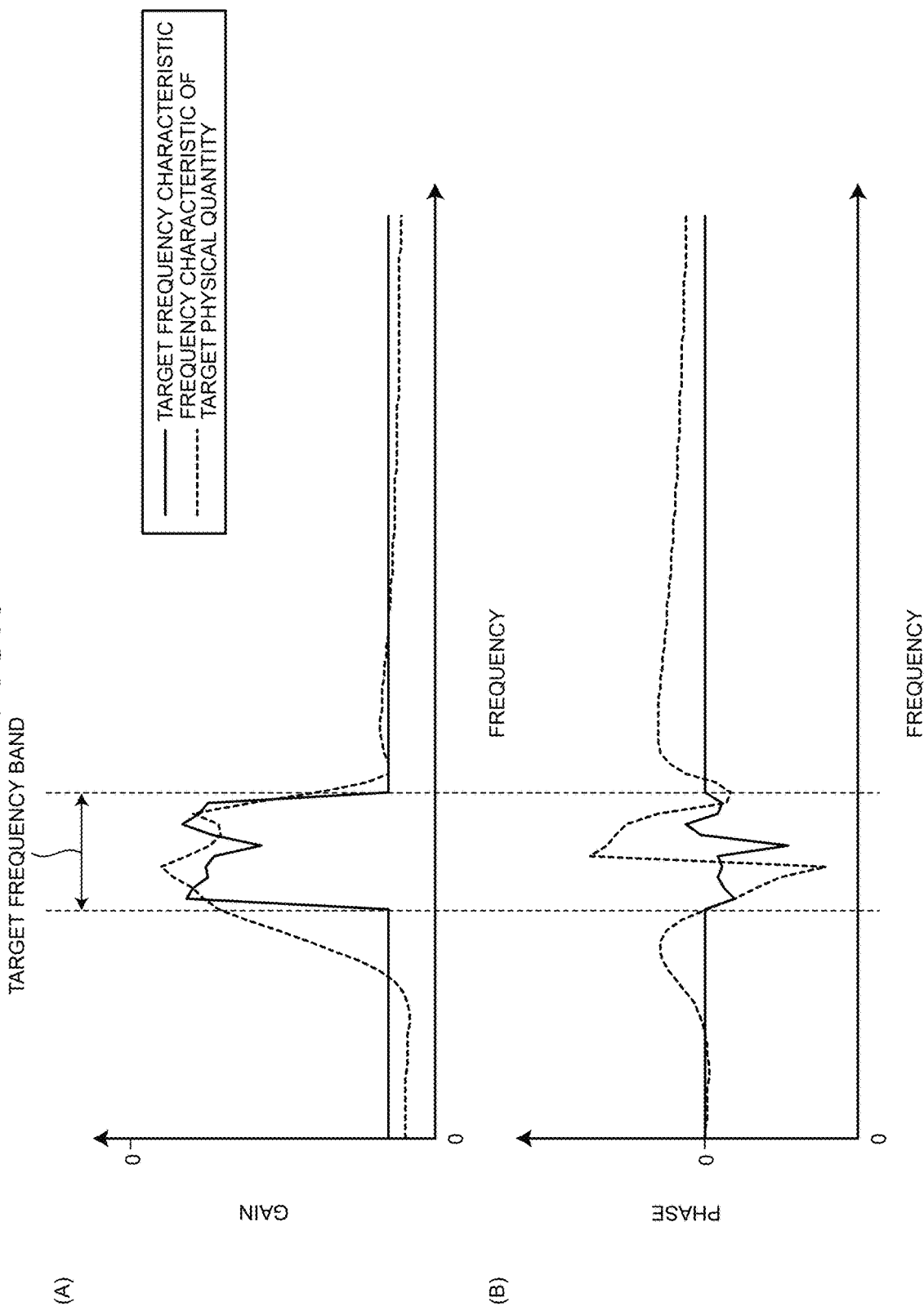

MAGNETIC DISK DEVICE AND METHOD

CROSS-REFERENCE TO RELATED APPLICATIONS

This application is based upon and claims the benefit of priority from Japanese Patent Application No. 2024-031640, filed on Mar. 1, 2024; the entire contents of which are incorporated herein by reference.

FIELD

Embodiments described herein relate generally to a magnetic disk device and a method.

BACKGROUND

In a magnetic disk device, a magnetic head is moved in a radial direction of a magnetic disk by a voice coil motor (VCM). In order to suppress the influence of disturbance on the positioning accuracy of the magnetic head, feedforward control based on various sensor values may be executed on an instruction value of the current that drives the VCM.

BRIEF DESCRIPTION OF THE DRAWINGS

FIG. 4 is a flowchart illustrating an example of operations of the magnetic disk device according to the embodiment;

FIG. 5 is a diagram illustrating an example of various waveforms acquired in the magnetic disk device according to the embodiment; and FIG. 6 is a diagram illustrating an example of a method of adjusting a coefficient of a numerator and a coefficient of a denominator of an IIR type transfer function of an FF controller according to the embodiment.

DETAILED DESCRIPTION

In general, according to one embodiment, a magnetic disk device includes a magnetic disk, a magnetic head, an actuator arm, a motor, a drive circuit, a first sensor, and a controller. The magnetic head is configured to write and read data to and from the magnetic disk. The actuator arm has the magnetic head at a distal end. The motor is configured to move the actuator arm to move the magnetic head in a radial direction of the magnetic disk. The drive circuit is configured to generate a first current that drives the motor by an amount according to an instruction value and supply the generated first current to the motor. The first sensor is configured to detect a predetermined physical quantity. The controller is configured to: detect a position of the magnetic head; generate a first instruction value so as to reduce a deviation amount of a detection position of the magnetic head from a target position of the magnetic head; correct the first instruction value by a first feedforward control based on a first detection value obtained by the first sensor; input a second instruction value, which is a value obtained by correcting the first instruction value, to the drive circuit as the instruction value; and execute a first operation in accordance with occurrence of a set event. In the first operation, the controller is configured to adjust a coefficient of a transfer function of the first feedforward control by the following operation. That is, the controller is configured to acquire a first waveform that is a waveform of the deviation amount, and acquire from the first waveform a first frequency band that is a frequency band whose amplitude is greater than a first threshold. The controller is configured to adjust the coefficient of the transfer function of the first feedforward control so as to suppress the first detection value in a second frequency band different from the first frequency band and output a correction amount for the first instruction value based on the first detection value in the first frequency band.

Exemplary embodiments of a magnetic disk device and a method will be explained below in detail with reference to the accompanying drawings. The present invention is not limited to the following embodiments.

Embodiments

Figure 1:
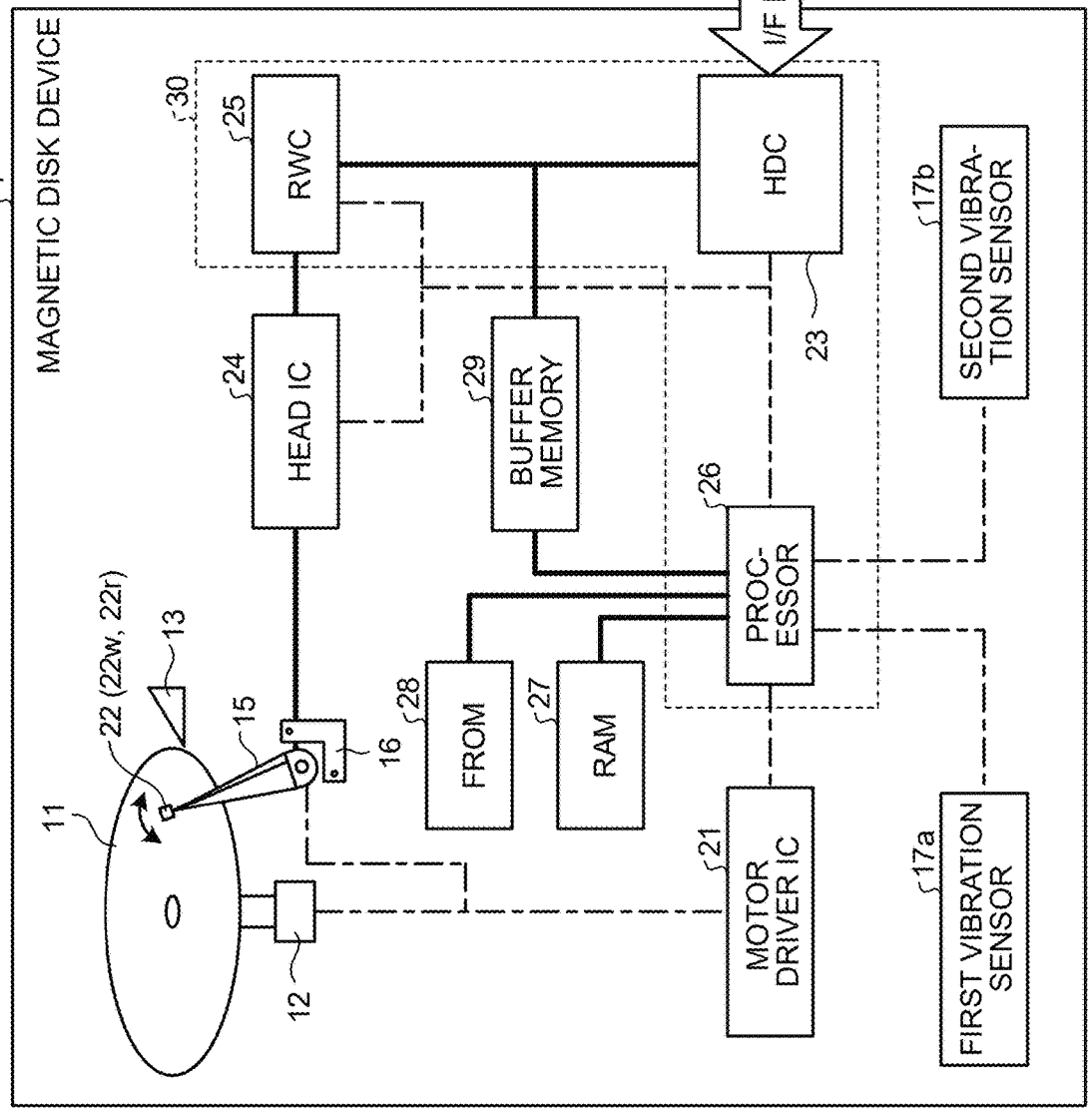
FIG. 1 is a schematic diagram illustrating an example of a configuration of a magnetic disk device according to an embodiment.

FIG. 1 is a schematic diagram illustrating an example of a configuration of a magnetic disk device 1 according to an embodiment.

The magnetic disk device 1 is connected to a host 2. The magnetic disk device 1 can receive an access command such as a write command or a read command from the host 2.

The magnetic disk device 1 includes a magnetic disk 11 having a magnetic layer formed on a surface thereof. The magnetic disk device 1 writes data to the magnetic disk 11 or reads data from the magnetic disk 11 in response to the access command.

Data is written and read via a magnetic head 22. The magnetic disk device 1 includes, in addition to the magnetic disk 11, a spindle motor 12, a ramp 13, an actuator arm 15, a voice coil motor (VCM) 16, a first vibration sensor 17a, a second vibration sensor 17b, a motor driver integrated circuit (IC) 21, a magnetic head 22, a hard disk controller (HDC) 23, a head IC 24, a read/write channel (RWC) 25, a processor 26, RAM 27, flash read only memory (FROM) 28, and buffer memory 29.

The magnetic disk 11 is rotated at a predetermined rotation speed by the spindle motor 12 attached coaxially. Rotation of the spindle motor 12 is driven by the motor driver IC 21.

The motor driver IC 21 drives the spindle motor 12 and the VCM 16 under the control of the processor 26. In particular, regarding the VCM 16, the motor driver IC 21 receives, from the processor 26, an input of an instruction value regarding the current to be supplied to the VCM 16, and generates a current of an amount corresponding to the instruction value. The motor driver IC 21 then supplies the generated current to the VCM 16. The current supplied to the VCM 16 is referred to as a VCM current. An instruction value related to the VCM current input from the processor 26 to the motor driver IC 21 is referred to as a VCM current instruction value.

The magnetic head 22 uses its own elements of a write element $22w$ and a read element $22r$ to write and read data to and from the magnetic disk 11. The magnetic head 22 is attached to a distal end of the actuator arm 15. The VCM 16 moves the actuator arm to move the magnetic head 22 in the radial direction of the magnetic disk 11. Note that one or both of the write element $22w$ and the read element $22r$ on the magnetic head 22 may be provided in plurality for a single magnetic head 22.

The VCM 16 is an example of a motor. The motor driver IC 21 is an example of a drive circuit.

For example, the magnetic head 22 is moved onto the ramp 13 during the time such as when the rotation of the magnetic disk 11 is stopped. The ramp 13 is configured to hold the magnetic head 22 at a position separated from the magnetic disk 11.

The head IC 24 amplifies and outputs a signal read from the magnetic disk 11 by the magnetic head 22 during the read operation, and supplies the amplified signal to the RWC 25. In addition, the head IC 24 amplifies, during the write operation, a signal corresponding to write target data supplied from the RWC 25 and supplies the amplified signal to the magnetic head 22.

The HDC 23 performs control of transmission and reception of data with the host 2 via the I/F bus, control of the buffer memory 29, and the like.

The buffer memory 29 is used as a buffer for data transmitted to and received from the host 2. For example, the buffer memory 29 is used to temporarily store write target data or data read from the magnetic disk 11.

The buffer memory 29 is formed with volatile memory capable of high-speed operation. The type of the memory constituting the buffer memory 29 is not limited to a specific type. The buffer memory 29 can be constituted with memory such as Dynamic Random Access Memory (DRAM) and Static Random Access Memory (SRAM), for example. The buffer memory 29 may be constituted with any types of non-volatile memory.

The RWC 25 performs modulation such as error correction coding on write target data supplied from the HDC 23, and supplies the modulated data to the head IC 24. In addition, the RWC 25 performs demodulation including error correction on the signal read from the magnetic disk 11 and supplied from the head IC 24, and then outputs the demodulated signal to the HDC 23 as digital data.

An example of the processor 26 is a central processing unit (CPU). The processor 26 is connected to the first vibration sensor 17a, the second vibration sensor 17b, the RAM 27, the FROM 28, and the buffer memory 29.

The FROM 28 is nonvolatile memory. The FROM 28 stores firmware (program data), various operation parameters, and the like. The operation parameter may include, for example, thresholds Th1, Th2, and Th3 described below. Note that the firmware or various operation parameters may be stored in a predetermined area of the magnetic disk 11.

The RAM 27 includes, for example, DRAM, SRAM, or a combination thereof. The RAM 27 is used as operation memory by the processor 26. The RAM 27 is used as an area in which firmware is loaded and an area in which various types of operation parameters are temporarily stored.

The processor 26 performs overall control of the magnetic disk device 1 according to the firmware stored in the FROM 28 or the magnetic disk 11. For example, the processor 26 loads the firmware from the FROM 28 or the magnetic disk 11 into the RAM 27, and executes control of the motor driver IC 21, the head IC 24, the RWC 25, the HDC 23, and the like according to the loaded firmware.

The first vibration sensor 17a and the second vibration sensor 17b can detect the amount of vibration. The amount of vibration detected by the vibration sensor 17 is displacement, speed, acceleration, or any other physical quantity. In order to suppress the influence of vibration received by the magnetic disk device 1 from the outside or vibration generated in the magnetic disk device 1 on the positioning control accuracy, the processor 26 performs feedforward control on the VCM current instruction value based on the detection values obtained by the first vibration sensor 17a and the second vibration sensor 17b. Details of the feedforward control on the VCM current instruction value will be described below.

The configuration including the HDC 23, the RWC 25, and the processor 26 can also be regarded as a controller 30 that controls operations of the magnetic disk device 1. In addition to these components, the controller 30 may include other components (For example, the RAM 27, the FROM 28, the buffer memory 29, and the like). The controller 30 may be formed as one system-on-a-chip (SoC) or may be formed with two or more chips.

Part or all of the functions of the processor 26 may be implemented by a hardware circuit such as a field-programmable gate array (FPGA) or an application specific integrated circuit (ASIC).

The number of the magnetic disks 11 included in the magnetic disk device 1 is not limited to one. The magnetic disk device 1 may include actuator arms 15 and magnetic heads 22 in a number corresponding to the number of magnetic disks 11. In a case where the magnetic disk device 1 includes a plurality of magnetic heads 22, the plurality of magnetic heads 22 may be integrally moved, or the plurality of magnetic heads 22 may constitute a plurality of groups each being independently movable.

Figure 2:
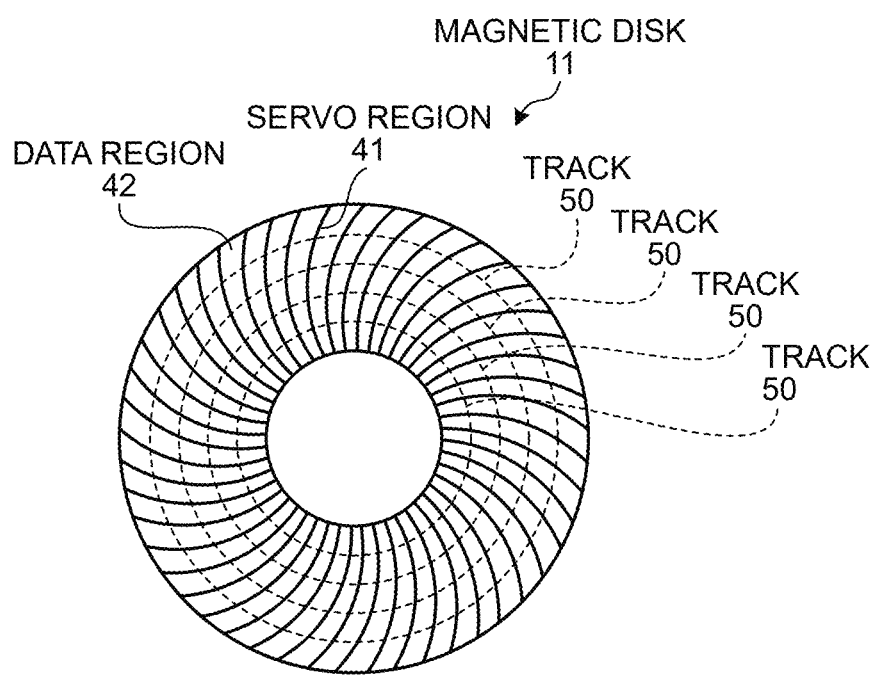
FIG. 2 is a diagram illustrating an example of a configuration of the magnetic disk according to the embodiment.

FIG. 2 is a diagram illustrating an example of a configuration of the magnetic disk 11 according to the embodiment. Servo data used for positioning the magnetic head 22 is written to a magnetic layer formed on a surface of the magnetic disk 11 by using a servo writer or self-servo write (SSW), for example.

FIG. 2 illustrates a servo region 41 radially arranged as an example of arrangement of a servo region in which the servo data is written. In the circumferential direction, a space between the two servo regions 41 is defined as a data region 42 in which data can be written. The magnetic disk 11 includes a plurality of concentric tracks (for example, tracks 50 in the drawing) set in the radial direction. The region delimited by the servo region 41 on the track 50 is also referred to as a servo sector.

The servo data includes a servo mark, Gray code, a burst pattern, and a post code. The servo mark indicates the start of the servo data. The Gray code includes an ID for identifying each track 50 provided in the magnetic disk 11, that is, a track number, and an ID for identifying each servo sector (that is, the servo region 41) on the track 50, namely, a servo sector number. The burst pattern is data used to detect the amount of position shift of the track indicated by the track number included in the Gray code from the center. The track number included in the Gray code is given as an integer value, for example. Demodulation of the burst pattern makes it possible to obtain an offset amount of decimal places based on the position indicated by the track number. That is, by demodulating the burst pattern, the current position of the magnetic head 22 in the radial direction is obtained. The post code is data for correcting position shift of the shape of the track 50 defined by the Gray code and the burst pattern from the ideal shape of the track 50.

When writing data to the magnetic disk 11 or reading data from the magnetic disk 11, the controller 30 executes positioning control of the magnetic head 22 based on the servo data read by the magnetic head 22 from the servo region 41. In the positioning control, the controller 30 generates the VCM current instruction value so as to reduce the deviation amount (hereinafter, it is described as a position deviation amount) of the detected position from the target position of the magnetic head 22.

The positioning control includes a control of a seek operation and a control of a tracking operation. The seek operation is an operation of moving the magnetic head 22 in the radial direction toward the target track. The tracking operation is an operation of maintaining the magnetic head 22 on a target track.

In the seek operation, the controller 30 executes a seek settling operation. The seek settling operation is an operation of determining whether to start an access (that is, write or read) to the magnetic disk 11 based on the position deviation amount. In one example, the seek settling operation includes determination of whether the position deviation amount has continued to fall within a set range for a predetermined time. When it is confirmed that the position deviation amount has continued to fall within the set range for a predetermined time, the seek settling operation (and seek operation) are completed, the tracking operation is started, and write or read to/from the magnetic disk 11 is started while the tracking operation is under control.

In the embodiment, the controller 30 performs feedforward control on the VCM current instruction value in the seek operation. The controller 30 performs feedforward control on the VCM current instruction value to suppress the influence of disturbance such as vibration on the positioning accuracy in the seek operation.

Note that the feedforward control on the VCM current instruction value can be performed based on a detection value obtained by an optionally selected sensor in addition to or instead of the detection value obtained by the first vibration sensor 17a and the detection value obtained by the second vibration sensor 17b described above. Here, as an example, it is assumed that the feedforward control on the VCM current instruction value is executed based on the detection value obtained by the first vibration sensor 17a, the detection value obtained by the second vibration sensor 17b, and the detection value of the VCM current supplied to the VCM 16.

Hereinafter, the detection value obtained by the first vibration sensor 17a is referred to as a first vibration detection value. The detection value obtained by the second vibration sensor 17b is referred to as a second vibration detection value. The detection value of the VCM current supplied to the VCM 16 is referred to as a VCM current detection value.

Figure 3:
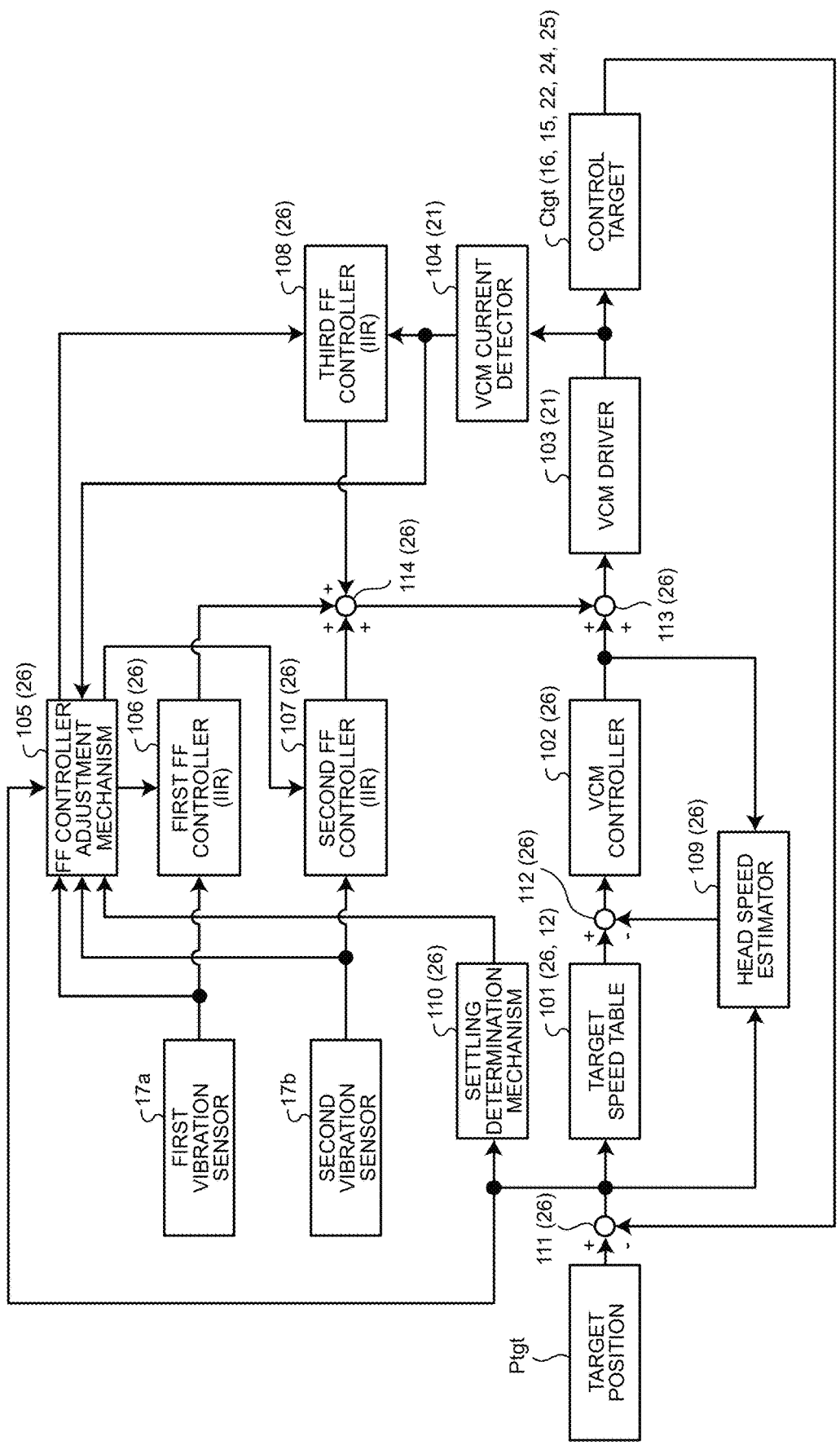
FIG. 3 is a diagram illustrating an example of a control block in a seek operation, included in the magnetic disk device according to the embodiment.

FIG. 3 is a diagram illustrating an example of a control block in a seek operation, included in the magnetic disk device 1 according to the embodiment.

The magnetic disk device 1 includes a target speed table 101, a VCM controller 102, a VCM driver 103, a VCM current detector 104, a feed forward (FF) controller adjustment mechanism 105, a first FF controller 106, a second FF controller 107, a third FF controller 108, a head speed estimator 109, a settling determination mechanism 110, and four adders 111 to 114.

The target speed table 101 is stored in the FROM 28, for example, and read by the processor 26. The VCM controller 102, the FF controller adjustment mechanism 105, the first FF controller 106, the second FF controller 107, the third FF controller 108, the head speed estimator 109, the settling determination mechanism 110, and the four adders 111 to 114 are implemented by the processor 26. The VCM driver 103 and the VCM current detector 104 are included in the motor driver IC 21.

In the description of the present specification, addition includes not only calculation of addition of a positive value but also calculation of addition of a negative value, that is, subtraction. That is, some or all of the four adders 111 to 114 can also perform subtraction.

The magnetic disk device 1 controls the control target Ctgt by these functional components. The control target Ctgt includes the VCM 16, the actuator arm 15, the magnetic head 22, the head IC 24, and the RWC 25. The processor 26 detects the current position of the magnetic head 22 in the radial direction based on the servo data read from the servo sector, and acquires the detected position.

In addition, the processor 26 performs a predetermined calculation to acquire a target position Ptgt, which is a target position in the radial direction. The adder 111 performs calculation of subtracting the detection position from the target position Ptgt to acquire the position deviation amount in the radial direction.

The processor 26 acquires the target speed in the radial direction of the magnetic head 22 based on the position deviation amount and the target speed table 101.

The target speed table 101 includes information that defines a relationship between a seek distance and a target speed of the magnetic head 22 in the radial direction. The seek distance is a distance in the radial direction from the current position of the magnetic head 22 to the target track. In the target speed table 101, for example, the relationship between the seek distance and the target speed of the magnetic head 22 is defined so that the longer the seek distance, the higher the target speed of the magnetic head 22 will be. The processor 26 searches the target speed table 101 using the position deviation amount as the seek distance, thereby acquiring the target speed of the magnetic head 22 corresponding to the position deviation amount.

The target speed table 101 may represent information in the form of a table or may be in the form of a mathematical expression. The processor 26 may further perform fine adjustment on the target speed obtained based on the target speed table 101.

The speed of the magnetic head 22 and the speed of the VCM 16 can be easily converted with each other. Accordingly, the target speed may be expressed as the motor speed of the VCM 16. Hereinafter, the speed (including the target speed and the like) will be described as the speed of the magnetic head 22 in the radial direction. Furthermore, the speed of the magnetic head 22 is to be represented as the speed of the magnetic head 22 in the radial direction.

The head speed estimator 109 estimates the speed of the magnetic head 22 based on the position deviation amount and the VCM current instruction value.

The adder 112 performs calculation of subtracting the estimated value of the speed of the magnetic head 22 obtained by the head speed estimator 109 from the target speed, thereby acquiring the speed deviation amount.

The VCM controller 102 calculates a VCM current instruction value based on the speed deviation amount. The VCM controller 102 calculates the VCM current instruction value so that the speed deviation amount decreases, in other words, the speed of the magnetic head 22 in the radial direction approaches the target speed. In one example, the VCM controller 102 calculates the VCM current instruction value such that the greater the absolute value of the speed deviation amount, the greater the VCM current instruction value will be.

The adder 113 corrects the VCM current instruction value by calculation of adding a correction amount by the feedforward control to the VCM current instruction value obtained by the VCM controller 102. The VCM current instruction value before correction by the adder 113 is referred to as a first VCM current instruction value. The VCM current instruction value after correction by the adder 113 is referred to as a second VCM current instruction value.

The VCM current instruction value used by the head speed estimator 109 to estimate the speed of the magnetic head 22 is the first VCM current instruction value.

The VCM driver 103 generates the VCM current of an amount corresponding to the second VCM current instruction value. The VCM current generated by the VCM driver 103 is supplied to the VCM 16 among the control target Ctgt.

The VCM current detector 104 detects the amount of the VCM current generated by the VCM driver 103 and supplied to the VCM 16. The amount of the VCM current detected by the VCM current detector 104 is referred to as a VCM current detection value.

The first FF controller 106 calculates a correction amount to be used in the feedforward control based on the detection value obtained by the first vibration sensor 17a. The second FF controller 107 calculates a correction amount to be used in feedforward control based on the detection value obtained by the second vibration sensor 17b. The third FF controller 108 calculates a correction amount to be used in the feedforward control based on the VCM current detection value.

The adder 114 adds the correction amounts acquired by the first FF controller 106, the second FF controller 107, and the third FF controller 108. The sum of the correction amounts obtained by the adder 114 is input to the adder 113. The adder 113 adds the sum of the correction amounts input from the adder 114 to the first VCM current instruction value, thereby acquiring the second VCM current instruction value.

The first vibration sensor 17a, the second vibration sensor 17b, and the VCM current detector 104 each are an example of a second sensor. One of the first vibration sensor 17a, the second vibration sensor 17b, and the VCM current detector 104 is an example of a first sensor that detects a predetermined physical quantity. The physical quantity detected by the first vibration sensor 17a and the second vibration sensor 17b is vibration. The physical quantity detected by the VCM current detector 104 is the VCM current.

The correction amount by each of the first FF controller 106, the second FF controller 107, and the third FF controller 108 is obtained by executing calculation using an infinite impulse response (IIR) filter. That is, each of the first FF controller 106, the second FF controller 107, and the third FF controller 108 has an IIR type transfer function.

Having internal feedback, the IIR filter is capable of complicated control with a simpler structure as compared with a finite impulse response (FIR) filter. If control equivalent to that of the IIR filter is to be performed by the FIR filter, it is inevitable to increase the order of the FIR filter, which would increase the calculation amount of the FIR filter. Here, the calculation of the correction amount by each of the first FF controller 106, the second FF controller 107, and the third FF controller 108 is executed using an IIR filter, making it possible to perform feedforward control with high accuracy with a low calculation amount.

The FF controller adjustment mechanism 105 individually adjusts the coefficient of the transfer function of the IIR filter used in the first FF controller 106, the coefficient of the transfer function of the IIR filter used in the second FF controller 107, and the coefficient of the transfer function of the IIR filter used in the third FF controller 108. The FF controller adjustment mechanism 105 adjusts both the numerator coefficient and the denominator coefficient for the transfer function of each IIR filter.

The settling determination mechanism 110 determines whether a seek settling operation is being executed based on the position deviation amount. While the seek settling operation is being executed, a signal indicating that the seek settling operation is being executed is input to the FF controller adjustment mechanism 105. A signal indicating whether the seek settling operation is being executed is referred to as a settling flag.

The transition of the position deviation amount during the period of the seek settling operation is related to the accuracy of positioning control. In a case where the accuracy of the positioning control is deteriorated due to disturbance (here, vibration or fluctuation of the VCM current) or the like, the transition of the position deviation amount during the period of the seek settling operation indicates an increased amplitude of the position deviation amount or a longer time required for the seek settling operation compared with a case where the accuracy of the positioning control is good. That is, the transition of the position deviation amount during the period of the seek settling operation is considered to reflect the influence of disturbance. Accordingly, the settling determination mechanism 110 adjusts the coefficients of the transfer functions of the individual IIR filters of the first FF controller 106, the second FF controller 107, and the third FF controller 108 based on the transition of the position deviation amount in the period of the seek settling operation.

Incidentally, the FF controller adjustment mechanism 105 receives input of not only the settling flag, but also the position deviation amount, the detection value obtained by the first vibration sensor 17a, the detection value obtained by the second vibration sensor 17b, and the VCM current detection value. Based on the input information, the FF controller adjustment mechanism 105 adjusts the coefficients of the transfer functions of the individual IIR filters of the first FF controller 106, the second FF controller 107, and the third FF controller 108.

The timing of adjustment of the coefficient of the transfer function of each IIR filter is not limited to a specific timing. The controller 30 may periodically adjust the coefficients of the transfer function of each IIR filter, or may adjust the coefficients of the transfer function of each IIR filter in accordance with occurrence of a specific event.

Here, as an example, the coefficient of the transfer function of each IIR filter is supposed to be adjusted when the positioning accuracy no longer satisfies a predetermined criterion. More specifically, the controller 30 monitors Input/Output Operations per Second (IOPS). IOPS is the number of processes per unit time executed by the magnetic disk device 1, and is one of indices indicating the performance of the magnetic disk device 1. At a timing at which IOPS falls below a predetermined threshold (referred to as a threshold Th1), the FF controller adjustment mechanism 105 adjusts the coefficient of the transfer function of each IIR filter. It is conceivable that the positioning accuracy deterioration leads to an increase of seek errors and reduction of IOPS. Therefore, when IOPS falls below the threshold Th1 preset value as a reference value, the controller 30 adjusts the coefficient of the transfer function of each IIR filter for recovery of the positioning accuracy.

FIG. 4 is a flowchart illustrating an example of operations of the magnetic disk device 1 according to the embodiment.

The controller 30 determines whether IOPS is smaller than the threshold Th1 (S101).

When IOPS is not smaller than the threshold Th1 (S101: No), the control proceeds to S114 described below.

When IOPS is smaller than the threshold Th1 (S101: Yes), the controller 30 adjusts the coefficient of the transfer function of each IIR filter by the operations of S102 to S113. The operations of S102 to S113 are an example of the first operation.

In the first operation, the controller 30 first determines whether an execution timing of the seek operation has arrived (S102). When the execution timing of the seek operation has not arrived (S102: No), the controller 30 executes the process of S102 again.

When the execution timing of the seek operation has arrived (S102: Yes), the FF controller adjustment mechanism 105 turns off the function of the feedforward control by the first FF controller 106, the second FF controller 107, and the third FF controller 108 (S103). In S103, the FF controller adjustment mechanism 105 causes the first FF controller 106, the second FF controller 107, and the third FF controller 108 to each output 0 as the correction amount, for example. This causes the first FF controller 106, the second FF controller 107, and the third FF controller 108 to be in a state of not executing feedforward control, so as to start positioning control under the influence of disturbance such as vibration and fluctuation of the VCM current.

The FF controller adjustment mechanism 105 starts acquisitions of individual values, namely, the first vibration detection value, the second vibration detection value, the VCM current detection value, and the position deviation amount (S104). The controller 30 starts a seek operation (S105).

Incidentally, the detection position is acquired from each servo sector in synchronization with the rotation angle of the magnetic disk 11. The controller 30 constitutes a sampled-data control system that determines an input to a control target (for example, the VCM 16) at regular time intervals. The VCM 16 is driven in 1/N cycle (N is an integer of 2 or more) of the acquisition cycle of the detection position, that is, can undergo multi-rate control. However, the acquisition timing of the first vibration detection value, the second vibration detection value, the VCM current detection value, and the position deviation amount is set as the same as the acquisition timing of the detection position. During the period of seek operation, time transitions of the first vibration detection value, the second vibration detection value, the VCM current detection value, and the position deviation amount are acquired as waveforms.

When the seek operation is completed (S106), the FF controller adjustment mechanism 105 ends acquisitions of the first vibration detection value, the second vibration detection value, the VCM current detection value, and the position deviation amount (S107).

The FF controller adjustment mechanism 105 acquires the waveform during the seek settling operation from the waveform of the position deviation amount acquired in the period of the seek operation (S108).

During the period of the seek settling operation among the seek operation, the settling determination mechanism 110 maintains the settling flag in an on state. Based on the settling flag, the FF controller adjustment mechanism 105 specifies and acquires the waveform during the seek settling operation from the waveform of the position deviation amount. The waveform of the position deviation amount during the seek settling operation acquired by the process of S108 is referred to as a settling position waveform.

FIG. 5 is a diagram illustrating an example of various waveforms acquired in the magnetic disk device 1 according to the embodiment. This drawing illustrates waveforms of the position deviation amount, the VCM current detection value, the first vibration detection value, the second vibration detection value, and the settling flag from the start of the seek operation to the completion of the seek operation.

When the seek operation is started, an acceleration period in which the magnetic head 22 is greatly accelerated toward the target track starts. When the magnetic head 22 approaches the target track, a deceleration period in which the magnetic head 22 is greatly decelerated starts. When the position deviation amount becomes a predetermined value or less after the deceleration period, the seek settling operation is executed. By maintaining the settling flag on, the FF controller adjustment mechanism 105 is notified that a seek settling operation is being performed. Regarding the position deviation amount, the FF controller adjustment mechanism 105 acquires the waveform during the seek settling operation.

Regarding the VCM current detection value, the first vibration detection value, and the second vibration detection value, waveforms in a period from the disclosure of the seek operation to the completion of the seek operation (in other words, the seek settling operation) are acquired.

The settling position waveform is an example of the first waveform. The waveform of the first vibration detection value, the waveform of the second vibration detection value, and the waveform of the VCM current detection value each are an example of a second waveform.

Now, description will continue by returning to FIG. 4. Following the process of S108, the FF controller adjustment mechanism 105 performs frequency analysis on the waveform of the first vibration detection value, the waveform of the second vibration detection value, the waveform of the VCM current detection value, and the settling position waveform (S109).

The frequency analysis is an analysis using a discrete Fourier transform, for example. The FF controller adjustment mechanism 105 performs frequency analysis to acquire characteristics for each waveform, specifically, a first characteristic indicating a relationship between a frequency and an amplitude (expressed as a gain) and a second characteristic indicating a relationship between a frequency and a phase.

Based on the first characteristic related to the settling position waveform, the FF controller adjustment mechanism 105 specifies a frequency band in which the gain is greater than a threshold Th2 in the settling position waveform (S110).

The threshold Th2 is a preset reference value for determining whether correction by feedforward control is necessary. That is, a frequency band in which the gain is greater than the threshold Th2 is regarded as a frequency band that needs correction for the VCM current instruction value by feedforward control; a frequency band in which the gain is not greater than the threshold Th2 is regarded as a frequency band that needs no correction for the VCM current instruction value by feedforward control. S110 specifies a frequency band that needs a correction by feedforward control. The frequency band acquired by the process of S110 is referred to as a target frequency band.

The target frequency band is an example of the first frequency band. The frequency band other than the target frequency band is an example of the second frequency band.

The FF controller adjustment mechanism 105 acquires coherence in the target frequency band between: waveforms of the first vibration detection value, the second vibration detection value, and the VCM current detection value; and the settling position waveform (S111).

Subsequently, the FF controller adjustment mechanism 105 specifies a physical quantity whose coherence in the target frequency band is greater than a threshold Th3 among the vibration detected by the first vibration sensor 17a, the vibration detected by the second vibration sensor 17b, and the VCM current detected by the VCM current detector 104 (S112).

S112 specifies a disturbance that has caused deterioration of positioning control. The threshold Th3 is a present reference value for determining whether a physical quantity to be detected by each sensor is a disturbance that has caused deterioration of positioning control. A physical quantity whose coherence is greater than the threshold Th3 is considered as a disturbance that has caused deterioration of the positioning control, while a physical quantity whose coherence is not greater than the threshold Th3 is not considered as a disturbance that has caused the deterioration of the positioning control. The physical quantity specified by the process of S112 is referred to as a target physical quantity.

The FF controller adjustment mechanism 105 adjusts a coefficient of a transfer function of an FF controller that performs feedforward control based on a target physical quantity, among the first FF controller 106, the second FF controller 107, and the third FF controller 108 (S113). S113 adjusts both the coefficient of the numerator and the coefficient of the denominator of the IIR type transfer function of the FF controller that performs the feedforward control based on the target physical quantity.

FIG. 6 is a diagram illustrating an example of a method of adjusting a coefficient of a numerator and a coefficient of a denominator of an IIR type transfer function of an FF controller according to the embodiment. (A) of FIG. 6 is a graph illustrating the first characteristic, and (B) of FIG. 6 is a graph illustrating the second characteristic. The graph of (A) of FIG. 6 and the graph of (B) of FIG. 6 individually illustrate a frequency characteristic of the target physical quantity and a target frequency characteristic (hereinafter, target frequency characteristic) of the FF controller that performs feedforward control based on the target physical quantity.

As illustrated in (A) and (B) of FIG. 6, the FF controller adjustment mechanism 105 designs the target frequency characteristic so as to suppress the target physical quantity in a frequency band other than the target frequency band and pass the target physical quantity in the target frequency band.

The FF controller adjustment mechanism 105 calculates a coefficient of a numerator and a coefficient of a denominator of the transfer function of the FF controller so that the frequency characteristic of the transfer function of the FF controller matches or approaches the target frequency characteristic. A calculation algorithm used to calculate the coefficient of the numerator and the coefficient of the denominator of the transfer function for achieving the target frequency characteristic is not limited to a specific algorithm. The FF controller adjustment mechanism 105 calculates the coefficient of the numerator and the coefficient of the denominator of the transfer function of the FF controller based on any known calculation algorithm.

Now, description will continue by returning to FIG. 4 again. When the seek operation is executed next after the process of S113, the FF controller adjustment mechanism 105 turns on the functions of the feedforward control by the first FF controller 106, the second FF controller 107, and the third FF controller 108 (S114). The control proceeds to S101.

In the example described above, the magnetic disk device 1 includes three sensors as sensors for detecting a physical quantity that can be a disturbance, namely, the first vibration sensor 17a, the second vibration sensor 17b, and the VCM current detector 104. The number of sensors for detecting a physical quantity that may be a disturbance, included in the magnetic disk device, 1 is not limited to a specific number as long as the number is one or more.

In addition, the number of FF controllers included in the controller 30 is not limited to three. The controller 30 includes FF controllers as many as the number of sensors for detecting a physical quantity that can be a disturbance, and each FF controller executes feedforward control based on a physical quantity detected by a mutually different sensor.

In addition, as illustrated in S112 and S113 of FIG. 4, the controller 30 specifies an FF controller as a transfer function coefficient adjustment target among the three FF controllers (first FF controller 106, second FF controller 107, and third FF controller 108) based on the coherence in the target frequency band. The method of specifying the FF controller as a transfer function coefficient adjustment target is not limited thereto. The controller 30 may set all the three FF controllers as transfer function coefficient adjustment target.

As described above, according to the embodiment, the controller 30 generates the first VCM current instruction value by the target speed table 101 and the VCM controller 102 so as to reduce the position deviation amount. The controller 30 corrects the first VCM current instruction value by feedforward control based on the physical quantity detected by the sensor, and inputs the second VCM current instruction value, which is the corrected first VCM current instruction value, to the motor driver IC 21. The motor driver IC 21 causes the VCM driver 103 to generate a VCM current of an amount corresponding to the second VCM current instruction value, and supplies the generated VCM current to the VCM 16. The controller 30 executes the first operation (refer to S101 to S113 in FIG. 4, for example) in accordance with occurrence of a set event. In the first operation, the controller 30 acquires the waveform of the position deviation amount, and acquires a frequency band in which the gain in the waveform of the position deviation amount is greater than the threshold Th2 as the target frequency band. Subsequently, the controller 30 adjusts the coefficient of the transfer function of the feedforward control so as to suppress the detection value obtained by the sensor in the frequency band other than the target frequency band and output the correction amount for the first VCM current instruction value based on the target frequency band.

Since the controller 30 can autonomously adjust the coefficient of the transfer function of the feedforward control, it is possible to improve the positioning accuracy.

In addition, according to the embodiment, the magnetic disk device 1 includes a plurality of sensors that detect physical quantities, and the controller 30 corrects the first VCM current instruction value by a plurality of feedforward controls based on the physical quantities detected by different sensors. In the first operation, the controller 30 selects one or more feedforward controls among the plurality of feedforward controls as a transfer function coefficient adjustment target.

This makes it possible to improve the positioning accuracy.

In addition, according to the embodiment, the controller 30 acquires a plurality of waveforms from a plurality of sensors. The controller 30 acquires coherence of each of the plurality of waveforms acquired from the plurality of sensors and the waveform of the position deviation amount, in the target frequency band.

Subsequently, a feedforward control based on a physical quantity whose coherence is greater than the threshold Th3 among the plurality of feedforward controls is specified, and a coefficient of a transfer function of the specified feedforward control is adjusted (refer to S112 and S113 in FIG. 4, for example).

That is, the physical quantity to be the disturbance causing the deterioration of the positioning control, among the plurality of physical quantities detected by the plurality of sensors, is specified, and the coefficient of the transfer function of the feedforward control based on the specified physical quantity is adjusted. This makes it possible to improve the positioning accuracy.

According to the embodiment, the controller 30 acquires the waveforms of the plurality of sensors during the seek operation, and acquires the waveform of the position deviation amount during the seek settling operation.

This makes it possible to improve the positioning accuracy in the seek operation, leading to improvement of the performance of the magnetic disk device 1.

Note that the first operation may be executed in the tracking operation in addition to the seek operation or instead of the seek operation. For example, the controller 30 acquires waveforms of the plurality of sensors and the waveform of the position deviation amount during a part or all of the period of the tracking operation. The controller 30 may use these acquired waveforms to specify a target frequency band, specify feedforward control of a transfer function coefficient adjustment target based on coherence in the target frequency band, etc.

In addition, according to the embodiment, the controller 30 monitors the number of processes per unit time of the magnetic disk device 1, and executes the first operation at a timing when the number of processes per unit time becomes smaller than the threshold Th1 (refer to S101 in FIG. 4, for example).

Therefore, when the performance is deteriorated, the performance can be recovered by adjusting the coefficient of the transfer function.

Further, according to the embodiment, each FF controller has an IIR type transfer function, and the controller 30 adjusts a coefficient included in a numerator of the transfer function and a coefficient included in a denominator of the transfer function.

The IIR filter can perform complicated control with a simpler structure as compared with the FIR filter. Since each FF controller performs correction by calculation using the IIR filter, it is possible to perform feedforward control with high accuracy with a low calculation amount. In addition, the controller 30 adjusts the coefficient included in the numerator of the transfer function and the coefficient included in the denominator of the transfer function, making it possible to allow the transfer function of the FF controller to have a frequency characteristic as close as possible to the target frequency characteristic. That is, the target frequency characteristic can be achieved with a simple method and high accuracy.

The transfer function of each FF controller need not be the IIR type transfer function. The transfer functions of some or all of the FF controllers may be FIR type transfer functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head configured to write and read data to and from the magnetic disk;
   an actuator arm having the magnetic head at a distal end;
   a motor configured to move the actuator arm to move the magnetic head in a radial direction of the magnetic disk;
   a drive circuit configured to generate a first current that drives the motor by an amount according to an instruction value and supply the generated first current to the motor;
   a first sensor configured to detect a predetermined physical quantity; and
   a controller configured to:
      detect a position of the magnetic head;
      generate a first instruction value so as to reduce a deviation amount of the detected position of the magnetic head from a target position of the magnetic head;
      correct the first instruction value by a first feedforward control based on a first detection value obtained by the first sensor;
      input a second instruction value, which is a value obtained by correcting the first instruction value, to the drive circuit as the instruction value; and
      execute a first operation in accordance with occurrence of a set event, the first operation being an operation of acquiring a first waveform that is a waveform of the deviation amount, acquiring from the first waveform a first frequency band that is a frequency band whose amplitude is greater than a first threshold, and adjusting a coefficient of a transfer function of the first feedforward control so as to suppress the first detection value in a second frequency band different from the first frequency band and output a correction amount for the first instruction value based on the first detection value in the first frequency band.

2. The magnetic disk device according to claim 1, further comprising:
   a plurality of second sensors each of which detects a predetermined physical quantity, the plurality of second sensors including the first sensor, wherein
   the controller is configured to correct the first instruction value by a plurality of second feedforward controls, the plurality of second feedforward controls including the first feedforward control, and each of the plurality of second feedforward controls being a control of generating a correction amount for the first instruction value based on a second detection value obtained by a mutually different one of the plurality of second sensors, and
   the controller is configured to adjust, in the first operation, a coefficient of a transfer function of each of one or more second feedforward controls among the plurality of second feedforward controls so as to suppress the second detection value in the second frequency band and generate a correction amount for the first instruction value based on the second detection value in the first frequency band.

3. The magnetic disk device according to claim 2, wherein in the first operation, the controller is configured to:
acquire a plurality of second waveforms, the plurality of second waveforms being waveforms of second detection values respectively obtained from the plurality of second sensors;
acquire coherence in the first frequency band between each of the plurality of second waveforms and the first waveform;
specify, among the second detection values and the second waveforms, a second feedforward control based on a second detection value constituting a second waveform whose coherence is greater than a second threshold among the plurality of second feedforward controls; and
adjust a coefficient of a transfer function of the specified second feedforward control.

4. The magnetic disk device according to claim 3, wherein each of the plurality of second waveforms includes a waveform during a seek operation, and
the first waveform includes a waveform during a seek settling operation.

5. The magnetic disk device according to claim 4, wherein the plurality of second sensors includes a vibration sensor and a sensor that detects an amount of the first current supplied to the motor.

6. The magnetic disk device according to claim 4, wherein the controller is configured to monitor a number of processes per unit time of the magnetic disk device, and
the set event includes a case where the number of processes is smaller than a third threshold.

7. The magnetic disk device according to claim 3, wherein the plurality of second sensors includes a vibration sensor and a sensor that detects an amount of the first current supplied to the motor.

8. The magnetic disk device according to claim 3, wherein the controller is configured to monitor a number of processes per unit time of the magnetic disk device, and
the set event includes a case where the number of processes is smaller than a third threshold.

9. The magnetic disk device according to claim 2, wherein the transfer function of each of the plurality of second feedforward controls includes an IIR type transfer function in which coefficients are included in a numerator and a denominator, and
the controller is configured to adjust, in the first operation, the coefficients included in the numerator and the denominator.

10. The magnetic disk device according to claim 2, wherein
the plurality of second sensors includes a vibration sensor and a sensor that detects an amount of the first current supplied to the motor.

11. The magnetic disk device according to claim 2, wherein
the controller is configured to monitor a number of processes per unit time of the magnetic disk device, and
the set event includes a case where the number of processes is smaller than a third threshold.

12. The magnetic disk device according to claim 1, wherein
the transfer function includes an infinite impulse response (IIR) type transfer function in which coefficients are included in a numerator and a denominator, and
the controller is configured to adjust, in the first operation, the coefficient included in the numerator of the transfer function and the coefficient included in the denominator of the transfer function.

13. The magnetic disk device according to claim 1, wherein
the first sensor includes either a vibration sensor or a sensor that detects an amount of the first current supplied to the motor.

14. The magnetic disk device according to claim 1, wherein
the controller is configured to monitor a number of processes per unit time of the magnetic disk device, and
the set event includes a case where the number of processes is smaller than a third threshold.

15. A method of controlling a magnetic disk device, the magnetic disk device including: a magnetic disk; a magnetic head; an actuator arm having the magnetic head at a distal end; a motor configured to move the actuator arm to move the magnetic head in a radial direction of the magnetic disk; a drive circuit configured to generate a first current that drives the motor by an amount according to an instruction value and supply the generated first current to the motor; and a first sensor configured to detect a predetermined physical quantity, the method comprising:
detecting a position of the magnetic head;
generating a first instruction value so as to reduce a deviation amount of the detected position of the magnetic head from a target position of the magnetic head;
correcting the first instruction value by a first feedforward control based on a first detection value obtained by the first sensor;
inputting a second instruction value, which is a value obtained by correcting the first instruction value, to the drive circuit as the instruction value; and
executing a first operation in accordance with occurrence of a set event, the first operation being an operation of acquiring a first waveform that is a waveform of the deviation amount, acquiring from the first waveform a first frequency band that is a frequency band whose amplitude is greater than a first threshold, and adjusting a coefficient of a transfer function of the first feedforward control so as to suppress the first detection value in a second frequency band different from the first frequency band and output a correction amount for the first instruction value based on the first detection value in the first frequency band.

16. The method according to claim 15, wherein
the magnetic disk device further includes a plurality of second sensors each of which detects a predetermined physical quantity, the plurality of second sensors including the first sensor, and
the method further comprises:
correcting the first instruction value by a plurality of second feedforward controls, the plurality of second feedforward controls including the first feedforward control, and each of the plurality of second feedforward controls being a control of generating a correction amount for the first instruction value based on a second detection value obtained by a mutually different one of the plurality of second sensors; and
adjusting, in the first operation, a coefficient of a transfer function of each of one or more second feedforward controls among the plurality of second feedforward controls so as to suppress the second detection value in the second frequency band and generate a correction amount for the first instruction value based on the second detection value in the first frequency band.

17. The method according to claim 16, further comprising:
in the first operation,
acquiring a plurality of second waveforms, the plurality of second waveforms being waveforms of second detection values respectively obtained from the plurality of second sensors;
acquiring coherence in the first frequency band between each of the plurality of second waveforms and the first waveform;
specifying, among the second detection values and the second waveforms, a second feedforward control based on a second detection value constituting a second waveform whose coherence is greater than a second threshold among the plurality of second feedforward controls; and
adjusting a coefficient of a transfer function of the specified second feedforward control.

18. The method according to claim 17, wherein
each of the plurality of second waveforms includes a waveform during a seek operation, and
the first waveform includes a waveform during a seek settling operation.

19. The method according to claim 16, wherein
the transfer function of each of the plurality of second feedforward controls includes an IIR type transfer function in which coefficients are included in a numerator and a denominator, and
the method further comprises adjusting, in the first operation, the coefficients included in the numerator and the denominator.

20. The method according to claim 15, wherein
the transfer function includes an IIR type transfer function in which coefficients are included in a numerator and a denominator, and
the method further comprises adjusting, in the first operation, the coefficient included in the numerator of the transfer function and the coefficient included in the denominator of the transfer function.

* * * * *